United States Patent [19]
Vartanian et al.

[11] 3,818,581
[45] June 25, 1974

[54] CAPACITOR ELECTRODE

[75] Inventors: Haig Vartanian, Newton; Alan W. Postlethwaite, Cambridge, both of Mass.; Robert Y. L. Mao, Glenbrook, Conn.

[73] Assignee: Norton Company, Worcester, Mass.

[22] Filed: Sept. 28, 1972

[21] Appl. No.: 293,114

[52] U.S. Cl............... 29/570, 29/420.5, 29/419, 317/230, 29/628
[51] Int. Cl............................................. B01j 17/00
[58] Field of Search...... 29/419, DIG. 31, 628, 420, 29/420.5, 570; 317/230; 200/166 C

[56] References Cited
UNITED STATES PATENTS

| | | | |
|---|---|---|---|
| 3,365,777 | 1/1968 | MacDonald | 29/420.5 |
| 3,403,303 | 9/1968 | Klein | 29/570 |
| 3,474,516 | 10/1969 | Finlay | 29/420.5 |
| 3,506,885 | 4/1970 | Roberts | 317/230 |
| 3,688,161 | 8/1972 | Klein | 29/570 |
| 3,742,369 | 6/1973 | Douglass | 29/424 |

*Primary Examiner*—W. Tupman
*Attorney, Agent, or Firm*—Oliver W. Hayes

[57] ABSTRACT

Improved capacitor anodes, and like products, in which the product is produced by sintering a powder compact, working the compact down to a smaller shape through the application of compressive forces and in such fashion that the individual powder particles are stretched into fibers to form a resultant electrode product of interconnected elongated fibers with elongated metallurgical bonds corresponding to the original powder-to-powder bonds. The improvement comprises forming a very dense core or backing layer in the elongated end product. The core facilitates an attachment of lead wires and avoidance of impurities in the product. It is formed by providing a dense core in the original powder compact either through a graded density of powder therein or insertion of a solid core member, in preferred and distinctly advantageous embodiments. The manufacture of such devices is carried out in a manner to produce solid electrolytic capacitors with good life test stability. Specific densification and bonding conditions, using a sinter-press-sinter three stage process, and extrusion working and electrochemical leaching of a working matrix afford further improvement in performance.

13 Claims, 3 Drawing Figures

PATENTED JUN25 1974 3,818,581
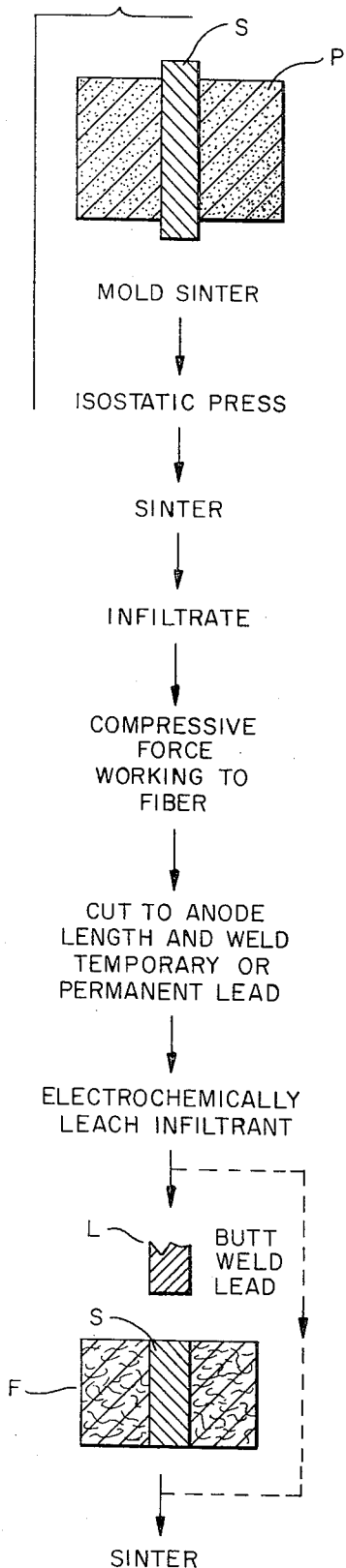
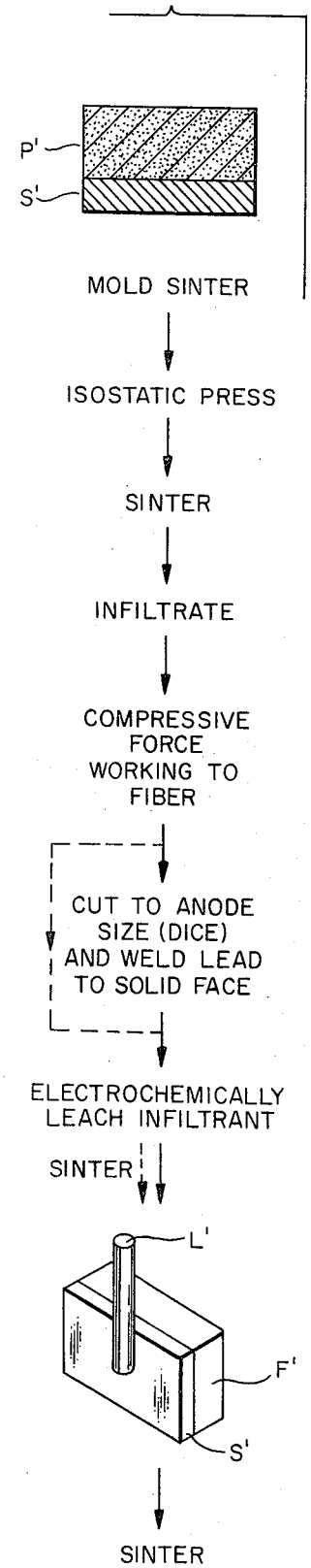
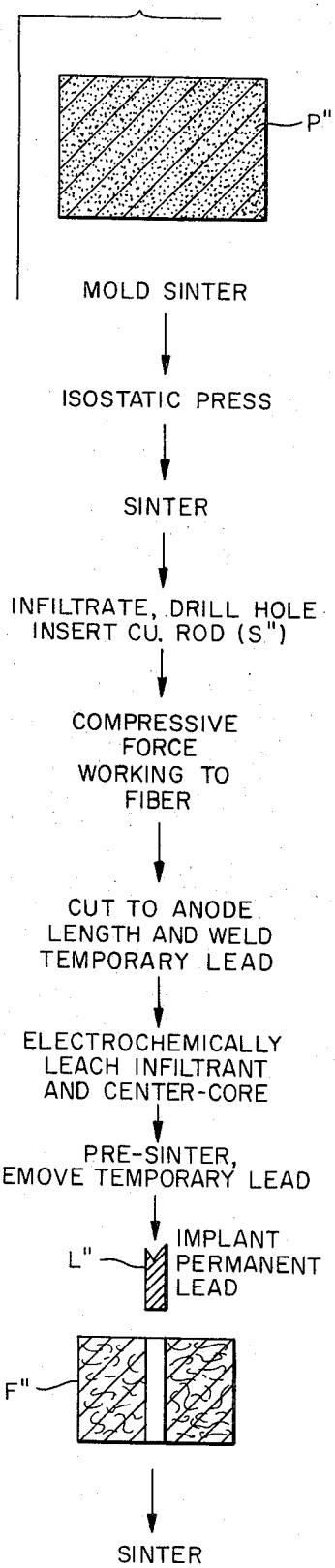

CAPACITOR ELECTRODE

BACKGROUND OF THE INVENTION

The present invention relates to fiber metal products useful for capacitor electrode manufacture and in like applications, the capacitors per se and methods of manufacture of such products. The invention relates more particularly to an electrolytic capacitor anode which comprises a porous bundle of such fibers and methods of making such product and devices utilizing such product. Reference should be had to the related U.S. patent application, Ser. No. 839,024, filed July 3, 1969 and further applications therein cited, all of common assignment with the present application.

It is a continuing objective of the capacitor industry to enhance effective surface area of capacitor electrodes, particularly for dielectrics formed of surface layer oxides of expensive valve metals such as tantalum. Progress has been made in developing fine powder blends which can be sintered to porous anode electrodes offering specific capacitances of on the order of 8000 microfarad volts per gram (as measured by standard industry wet cell testing techniques in 10 percent $H_3PO_4$ for anodes with a surface layer dielectric oxide produced by anodizing to 200 volts in .01% $H_3PO_4$). But further progress is needed to make high quality expensive materials such as tantalum economically attractive in areas of the capacitor industry served by cheaper materials (e.g. aluminum foil and aluminum powder anodes for electrolytic capacitor devices) or to meet the existing demand for better capacitors per unit of weight or volume in applications served by state-of-the-art capacitors. The above cited related application(s) describe a fibered valve metal approach to achieving these goals and also give the relevant criteria and additional background in relation thereto.

It is a further objective of the capacitor industry to reduce costs of capacitor processing through elimination of batch processing steps in favor of continuous processing.

The above mentioned fibered valve metal approach also lends itself to automated processing to anodes of both cylindrical and sheet forms as described in the above cited applications.

To meet this objective, the industry has considered the use of a continuous sheet (foil) configuration having powder anodes sintered thereto.

One obstacle to development in the foregoing areas is the difficulty of obtaining an effective lead contact, particularly where a lead is to be bonded directly to the fibered mass. Another difficulty facing the powder on foil development is that of obtaining a uniform product.

It is an important object of the present invention to overcome the foregoing problems.

It is a related object of the invention to provide an improvement in the production of fibered valve metal capacitor electrode devices with good lead attachment, consistent with maintaining the favorable high capacitance properties of the fibered metal.

It is a related object of the invention to provide fibered valve metal structures which afford uniformity of electrical properties, thereby enhancing automation usage, consistent with the foregoing objects.

SUMMARY OF THE INVENTION

The objects of the invention are achieved through the formation of a composite layered structure having two distinct layers bonded to each other — a first layer of a porous mass of fibered metal and a second layer of a solid metal to which a lead wire is attached. "Solid" as used herein means having a density in excess of 75 percent of theoretical and porous means less than 75 percent density. The composite may take on two distinct forms, or variations thereof, which are (1) a concentric array with the porous mass being arrayed around the solid core or (2) a flat sheet array with two or more layers, with at least one of each of these distinct types of layers in contiguous face-to-face bonded relationship. Distinctly advantageous results are found to occur in connection with the starting compaction used in producing a porous compact which is fabricated to said fibered metal porous layer and, the working conditions and the manner of lead attachment.

The processing involves an assemblage of a porous powdered layer and a solid layer into a composite structure, along with bonding the powder within the porous layer, densification of the porous powder portion thereof, impregnation of the pores of the porous layer of the composite with a matrix material chosen to facilitate working the composite down to a reduced cross-section area through the application of compressive forces in a manner to cause fibering of the powder and similar elongation of the powder-to-powder bonds in the porous layer. By proper control of the compressive forces, the bond integrity between the fibered powder layer and the solid layer is maintained. The impregnant phase is then removed in a controlled manner to avoid swelling up of the porous fibered layer. The composite is cut down to individual anode sizes. A lead wire is attached to the solid layer component of each anode. The anodes are sintered to remove residual traces of the impregnant and to further strengthen the fiber structure and then further processed to electrolytic capacitor form of wet or solid type through dielectric oxide formation, conductive electrolyte impregnation, provision of a counter-electrode (cathode) and packaging.

The solid layer provides a distinct, reliable interface and current carrying path for making the lead wire connection to minimize erratic resistance losses through a lead/anode interface or within the fibrous anode.

The elongation of powders to fibers tends to produce a uniformity of structure and electrical behavior from anode to anode within the same stretched-out composite or from production run to production run in contrast to wire or sheet forms of etched solid materials or powder/solid laminated composites which would be alternate approaches to automated elongated form anode processing.

The processing steps which afford distinctly advantageous results in the above described process and one or more of which are used in the distinctly advantageous preferred process embodiments described below:

1. compaction of the powder layer to a density of 35–50 percent of theoretical density of the valve metal 2. using a sinter-pressing-sinter consolidation of the powder 3. electrochemical leaching as the step of impregnant matrix removal from fibered layer of the composite 4. low energy, high energy two step lead welding.

The resultant product of the above processing is a layered anode with solid and porous fibered layers and a lead connected to the solid layer (through a weld or comprising an extension of the solid layer). Within the fibrous layer are elongated fibers axially oriented in the direction of elongation of the layer (and of the composite) and the fibers are interconnected by similarly elongated bonds which run parallel to the direction of fiber elongation. A majority of such bond lengths are greater than the average fiber diameter (or thickness in the case of fibers in ribbon form).

Other objects, features and advantages, including several species, are in part described below and will in part be apparent to those skilled in the art from the present disclosure. The invention is now described in detail in regard to certain of its preferred embodiments each of which set forth as distinctly advantageous, per se, and also as illustrative of the described invention in its broader aspects. The detailed description with reference to the accompanying drawings wherein,

BRIEF DESCRIPTION OF THE DRAWINGS

FIGS. 1–3 are block diagrams, with illustrations of starting and final products, showing the process of the invention according to three preferred embodiments;

Insert 1 at the end of this specification comprises Tables 1–3, a compilation of test results from the Examples.

DETAILED DESCRIPTION OF PREFERRED EMBODIMENTS

Referring now to FIGS. 1–3, the three embodiments are now described.

In FIG. 1–FIG. 3, the letters S, S' refer to the solid layers of the first and second embodiments, respectively, and S'' refers to the late implanted solid layer of the third embodiment, P, P', P'' refers to the respective porous powder layers of the first, second and third embodiments, respectively, which are converted to impregnated powder compact layers and then to F, F', F'' fibrous compact layers. L, L' and L'' refers to their respective lead wires.

The dashed lines indicate alternative processing conditions. For instance in connection with FIG. 1, sintering might precede lead attachment and in FIG. 2, leaching and sintering (and possibly lead attachment) might precede cutting to individual anode size.

The first embodiment — FIG. 1 solid arrows — comprises the following details of processing.

An annular powder layer is assembled around a solid layer core. This is done in a cup-shaped mold. All of the powder layer, solid layer and mold are preferably made of the same valve metal-elemental tantalum. However, any of the known valve metals (including elements, alloys, compounds and mixtures) can be similarly treated and they may be mixed—e.g. using one valve metal as solid layer and another as powder layer, provided that they have sufficiently matched coefficients of thermal expansion to avoid delamination or cracking under service conditions.

The assembly is mold sintered in an inert atmosphere to a density of less than 35 percent of theoretical density of the porous layer and, preferably less than 25 percent, removed from the mold and isostatically pressed to increase its density into the range of 30 to 35 percent theoretical and the composite is also benefitted in this step by production of a dense outer skin layer which can be used, if desired, at a later step to limit expansion during leaching. After pressing the composite is given a main sinter to bring it to a density in the range of 35–45 percent theoretical.

The porous compact is then infiltrated with a second material which is compatible with it for purposes of coworking without excessive reaction. Copper is a particularly suitable infiltrant for tantalum in this regard. The composite is dipped into a melt of the infiltrant under conditions which promote good wetting of the interior of the porous layer P by the infiltrant with little or no chemical reaction.

The infiltrated composite is then subjected to cross-section reduction through the application of compressive forces through one or more of such conventional processes as extrustion, swaging, rod rolling, wire drawing, flat rolling (straight or cross). Such processing causes the powder particles of the original layer P to stretch out into fibers (of round or flat cross-section depending on the reduction method used) and causes original powder-to-powder sinter bonds to similarly stretch out. Most elongated bond lengths are greater than fiber diameter (or thickness in the case of flattened fibers). A porous skeletal compact of elongated valve metal fibers is surrounded by a similarly elongated matrix of the infiltrant.

The elongated composite product is cut to short lengths and a lead wire is butt-welded to an exposed end of the pre-implanted solid core (now reduced by the same factor as the composite — typically 10 to 20 X diameter reduction). Welding may be preceded by a pre-cleaning of the weld area by acid pickling, abrading or other cleaning method.

The infiltrant is then removed from the composite by electrochemical leaching. The composite with its attached lead wire, is the anode in an electrolysis cell, using a stainless steel or nickel cathode and 5% $H_2SO_4$ solution, operated at low voltage (less than 2 V constant voltage) conditions. The copper content in tantalum is reducible to the range of 100–300 parts per million by this process. The composite is then finally heat treated to reduce copper content to less than 5 parts per million and to reduce other impurities to levels suitable for capacitor use. The final heat treatment is in vacuum and at a temperature of about 1700°C for half an hour.

Other methods of infiltrant removal are chenical leaching and heat treating in vacuum per se. These are generally less preferred. Highly reactive acid leaches lead to swelling of the fibrous layer (apparently through pressure associated with hydrogen evolution) and does not provide as effective a clean-up. Also, extended heat treatments cause excessive shrinkage of the compact and loss of surface area and may also cause copper-tantalum interdiffusion and/or reaction. However, heat treatment after leaching is an important supplementary treatment where the residual infiltrant may be removed by vaporization (particularly when it is magnesium or other high vapor pressure material).

The composite formed by the above treatments is an anode. Its subsequent processing includes formation of a dielectric oxide layer on the interior surface of its porous layer by anodizing the valve metal, provision of an electrolyte (wet or solid), and contacting with a counter-electrode (cathode) and packaging.

The anodization is carried out in aqueous 0.01% H₃PO₄ solution at 92°C, at current densities of about one milliampere per square centimeter of nominal surface, forming to a final formation voltage, $V_F$, and holding for 2 hours. Wet cell testing is carried out in 30% H₂SO₄ solution under standard industry test procedures. Solids processing involves successive coatings of manganese dioxide by dipping the anode into manganese nitrate solution, heating with a controlled amount of water vapor after each dip to pyrolize the nitrate to solid manganese dioxide and reheating or reanodizing the anodic oxide layer after every three coatings. Typical schedules are Three coats using a 12 percent concentration MnNO₃ solution with pyrolysis by heating at 325°C for 8 minutes in water vapor ambient, and reanodizing to about 50 percent of $V_F$; then three coats, using a 25 percent solution; then three coats, using a 50 percent solution; and finally three coats, using a 50 percent solution. Several variations of this schedule are also used including many more coats for highly porous structures, and pyrolysis in air or steam atmosphere. After impregnation, a colloidal graphite suspension is applied to the outside of the device to form a cathode and the device is then packaged in accordance with conventional industry practice. Military specification life testing is carried out on samples to determine performance after operation at elevated temperatures and rated voltage bias for extended periods of time.

The various wet cell and solids tests are carried out at voltages of ¼ to ¾ of the prior formation voltages, depending on the degree of derating appropriate for the capacitor involved.

Turning now to FIG. 2 of the drawings, a second embodiment of the invention can be described. In this second embodiment a flat sheet of solid valve metal underlies the powder layer in the mold. The two layers are initially bonded in the mold sintering step (as in the first embodiment) and the bond is maintained throughout subsequent steps. The subsequent steps are as in the first embodiment with the variations that rolling is used for elongating the composite. Lead attachment is accomplished by a face-to-face weld of lead wire and the exposed side of the solid layer. Individual anodes may be punched or cut out of a sheet before or after lead attachments and before or after infiltrant removal (whereas in the first embodiment, lead attachment should precede infiltrant removal and follow cutting to length). It is economically advantageous and preferred to process the second embodiment as large sheets through solids processing before cutting to individual chips.

A third embodiment of the invention also illustrated in FIG. 1 involves using a leachable solid metal core in the powder layer such that final leaching removes both the infiltrant and the center core, leaving a center cavity in the anode. Before final heat treatment a lead wire is inserted into the cavity to constitute the solid layer. The final heat treatment step effects the necessary bond.

The powder compact could also be made with a center filled with graphite powder which is removed after the sinter-press-sinter steps to leave a cavity which is filled with copper during the infiltration step. The temporary insert could be eliminated after the initial sinter and isostatic fluid could be transmitted through the center cavity (using a doughnut form cover for the compact). As a further alternative the FIG. 3 process could be modified by inserting a pointed lead into the fibrous mass after leaching and without any center core formation.

The fibrous compact may be pre-sintered before implanting the permanent lead in its longitudinal center cavity.

Examples

The following non-limiting examples are illustrative of the practice of the invention.

EXAMPLE 1

A cylindrical graphite mold of about 8 inches length by 1.5 inches diameter was prepared. A .342 inch diameter tantalum, rod core was aligned with the center of the mold. Powder was packed in between the mold and rod to a length of 6 inches, with the ends of the rod projecting out from both ends of the mold. This molded powder/rod configuration was mold-sintered at 1600°C for one hour, producing a sintered density of the powder layer equal to 23.6 percent of theoretical density for tantalum. The mold-sintered composite was removed from the mold and subjected to isostatic pressing at 1500 psi to increase powder density to 32.3 percent of theoretical. Then the composite was sintered at 2200°C for two hours, which increased the sinter density to 37.9 percent of theoretical. The composite was placed in a vacuum chamber which had a crucible (graphite) containing copper therein. The chamber was evocuated and the copper was heated to cause melting and the sintered tantalum composite product was dipped into the copper for 10 minutes, with the copper held at 1200°C; and the composite then withdrawn. During the dipping the molten copper infiltrated the pore structure of the porous layer of sintered powder around the tantalum rod core. The infiltrated composite was removed from the chamber, machined to 1.25 inches diameter, and worked through the application of mechanical forces to effect a 100X area reduction (10X diameter reduction) by means of several extrusion passes, using a tightly-fitted copper jacket, until the diameter of the composite (exclusive of the copper jacket) was .160 inch. The copper jacket was mechanically removed, and the composite was further reduced by swaging to a .125 inch final diameter. Approximately 50 sections (anodes) of .250 inch length, were cut from a length of the .125 inch diameter composite, using an abrasive cut-off wheel.

A .020 inch diameter tantatum wire lead was attached to the solid tantalum core (.025 inch dia.) contained in each cut section (anode) according to the following procedure:

Anodes were treated with nitric acid (30%) to remove copper smear and contamination from cutting and to clearly define the solid core. After water rinsing and drying an indentation (.002 inch dia.) was made at the center of each core using a mechanical punch. The pointed end of .020 inch dia. tantalum wire was placed into the indentation and then butt-welded using a spot welding machine. Typical weld conditions were 2.5 lbs. pressure and 8 watt-sec.; resulting in welds exceeding 30,000 psi strength (tensile test). Examination of cross-sections of the weld area show the weld is localized to the solid tantalum core, thus eliminating a possible source of copper contamination of the weld.

The composite section, with an attached lead, was next electrochemically leached to remove the copper infiltrant. This was accomplished by making the composite section the anode of an electrolysis cell containing a 5 percent solution of sulphuric acid, using a stainless steel sheet as cathode. As many as 50 anodes were leached at one time. A 1 volt bias was maintained for a period ranging from 250–300 hours, during which time the current decreased from 1–2 millionperes per anode to less than 10 microamperes per anode. Residual copper after electrochemical leaching ranged from 100–200 parts per million.

The described method for removal of the copper infiltrant resulted in less than 5 percent expansion in the diameter of the infiltrated composite section. This is in contrast to much greater expansion (20–100 percent), when the copper is removed by direct chemical leaching with nitric acid.

Samples of the electrochemically leached product were subjected to a final treatment in a vacuum furnace by heating at 1600°C for one-half hour. This had the effect of reducing residual copper content to a level of less than two parts per million.

Sintered anodes were next coated with a dielectric oxide film by means of anodization, using as electrolyte a water solution of .01 percent phosphoric acid ($H_3PO_4$) at 90°C. Several formed anodes, usually four, were wet tested in 30 percent sulfuric acid for leakage current, capacitance, and dissipation. Test results are given in Table 1.

Another group of anodized anodes were further processed to solid-type electrolytic capacitors, using processing methods which are commonly practiced in the capacitor manufacturing industry. These involved repeated impregnation with an aqueous solution of manganese nitrate, each impregnation being followed by a pyrolyzing step at 300°C. in a flowing air ambient containing ½ atm. water vapor. After each group of three imgregnations and pyrolyses, anodes were reanodized in the described formation electrolyte to a voltage approximately one-half the original formation voltage. This sequence was repeated until a sufficient exterior coating of manganese dioxide was built up.

Fully impregnated anodes were counter-electroded by application of a coat of collodial graphite ("Aquadag"), followed by a coat of silver paint. A counter-electrode lead wire (.025 inch dia. copper) was attached to the bottom of the coated anode using a lead-tin solder (3 percent silver content). The capacitor unit was then encapsulated in plastic by mold casting with an epoxy type resin.

Electrical characteristics of solid capacitors, prepared in the described manner, are given in Table 1, and performance during life testing is given in Table 3.

EXAMPLE 1A

Additional anodes were process in the same manner as in Example 1 except that final sintering was performed at 1750°C as indicated in Table 1 below. The results of electrical testing for the product of such production are also given in Table 1.

EXAMPLE 2

Another group (80) of anodes were prepared through the sinter-press-sinter consolidation route described above. The density of the sintered powder layer, surrounding a .500 inch dia. solid tantalum core, after final sinter (2200°C.) was 38 percent of theoretical density. The copper infiltrated rod was fibered through extrusion; a reduction of 6.9 times in diameter to a final diameter of .270 inch being carried out.

After cutting, welding on a lead wire, and electrochemically leaching the copper infiltrant, the anodes were sintered at 1600°C for one-half hour. The anodes were coated with a dielectric oxide film by forming in a .01 percent phosphoric acid solution at 90°C and 35 ma/anode current density. Results of testing both wet and solid type capacitors were given in Table 1.

EXAMPLE 3

Another group (74) of anodes were prepared through the sinter-press-sinter consolidation route described above. The desnity of the sintered powder layer, surrounding a .342 inch dia. solid tantalum core, after final sinter (2200°C) was 41.2 percent of theoretical density. The copper infiltrated rod was fibered through swaging; a reduction of 10 times in diameter to a final diameter of .150 inch being carried out.

After cutting, welding on a lead wire and electrochemically leaching the copper infiltrant, and sintering at 1600°C for one-half hour, the anodes were coated with a dielectric oxide film by forming in a .01 percent phosphoric acid solution at 90°C and 35 ma/anode current density. Results of testing both wet and solid type capacitors are given in Table 1, and performance during life testing is given in Table 3.

EXAMPLE 4

A rectangular mold (1 inch wide by 2 inches deep) formed using .005 inch thick tantalum foil. A .040 inch thick tantalum sheet was placed in the bottom of the mold and tantalum powder was piled on top of the sheet to a height of .40 inch, to form an initial composite assembly. This assembly was sintered, using the tantalum mold, at 1600°C for one hour in a vacuum furnace. The composite produced was removed from the mold and isostatically pressed to a density of 33.4 percent of theoretical, followed by sintering at 2200°C for two hours (to 41.1 percent theoretical, density) and copper infiltraded as in Example 1.

The face of the infiltrated bar, opposite to the tantalum sheet, was milled smooth to a resulting bar thickness of .400 inch. The bar was then rolled to effect a thickness and area reduction of twenty times. This was accomplished by rolling in ten equal reduction passes of .038 inch per pass. Final thickness of the composite product was .020 inch, the solid tantalum face having a thickness of .002 inch.

Sections of rolled sheet were mounted on a cutting block and diced using a diamond-impregnated cut-off wheel. Typical chip dimensions were .035 inch wide × .035 inch deep × .020 inch high. Tantalum lead wires were attached by conventional welding procedure to each chip by welding the wire to the back side of the tantalum sheet away from the copper infiltrated composite layer. The product was electrochemically leached (125 hours) and finally sintered at 1750°C for one-half hour.

Conditions of dielectric oxide formation for such anodes, and wet and solid testing results, with variations of processing conditions, are given in Table 2 below.

EXAMPLE 5

A compact of powder was made up as in Example 1 according to the sinter-press-sinter consolidation route, with the difference that the solid tantalum core was omitted. Density of the tantalum powder rod (1.2 inch diameter), after 2200°C sintering was 40.7 percent of the theoretical density.

After copper infiltration of the sintered porous rod, a hole (.130 inch diam.) was drilled longitudinally along its axis in which a solid copper core was tightly fitted. The composite rod was then swaged to produce a ten times reduction in diameter, the inserted solid copper rod taking the place of the solid tantalum core (Example 1) during the fibering operation.

The composite product (.12 inch diameter) was cut into cylindrical sections of .250 inch length and a tantalum lead wire (.020 diameter) was welded to the side of each section, using welding conditions which resulted in a minimum strength bond.

The copper infiltrant was electrochemically leached from each composite section as in Example 1. This operation also resulted in the complete dissolution of the solid copper core, leaving a center cavity of .012 inch diameter.

The leached product was next heat treated for 10 min. at 1600°C, which strengthened (sintered) the fiber structure sufficiently to allow removal of the temporary tantalum lead without disruption of the fibrous structure.

A close fitting tantalum lead wire was then implanted into the cavity of each piece and the assemblies were sintered at 1600°C for one-half hour in a vacuum furnace.

The anodes were formed and wet cell tested as in the prior examples with wet test results given in Table 1. High leakage results of solid capacitors listed under Example 5 (Table 1) are attributable to the presence of radial cracks or fissures radiating out from the implanted lead wire (.020 inch dia. tantalum) after final anode sintering. Such cracks lead to excessive penetration of the graphite coating dispersion into the body of the anode; and are usually a consequence of an excessively thin manganese dioxide exterior coating. Therefore such radial cracks are to be avoided by proper matching of the diameters of the lead to be implanted and the axial cavity of the anode.

Several processing variations can be made within the scope of the invention. For instance, the sinter-press-sinter powder compaction sequence can be altered to a press-sinter-press-sinter or sinter-sinter-press. Some pressing to densify the skin of the powder layer is believed necessary to form a corresponding dense fiber skin which inhibits swelling during leaching. The sinter-press-sinter sequence of the Examples is, however, preferred and distinctly advantageous. Low powder compact densities are most desirable when final heat treatments are carried out at high temperatures and/or long times, as in the above Examples. This is because final anode sintering reduces available porosity created through fibering and leaching so that lower initial density before fibering results in more final porosity. In order to meet leakage specifications of the industry, the final heat treatment is necessary.

The initially selected powders should be highly structured as is the case with direct products of sodium reduction and leaching as described in Hellier et al., U.S. Pat. No. 2,950,185 and in various grades of agglomerated powders. Less preferred, but usable types of powders are the near spherical powders of the type produced via the process of Fincham, U.S. Pat. No. 3,295,951, since these require compact densification to over 45 percent theoretical density and have low initial porosity.

The structured powders are densified to the 35–45 percent theoretical density range with the compaction processes above described and survive subsequent processing and produce higher capacitance anodes.

By "structured" we mean powders which are sufficiently structured that they have a bulk density in −100 mesn/ +325 mesh fractions of less than 25% of theoretical density of the valve metal.

It is evident that those skilled in the art may now make numerous uses and modifications of, and departures from the specific embodiments described herein without departing from the inventive concepts. Consequently, the invention is to be construed as embracing each and every novel feature and novel combination of features present in, or possessed by the apparatus and techniques herein disclosed and limited solely by the scope and spirit of the appended claims.

TABLE I

ELECTRICAL TEST DATA FOR FIBER ANODES AND CAPACITORS

| | | | Wet test | | | | | | Solid test | | | | |
|---|---|---|---|---|---|---|---|---|---|---|---|---|---|
| Example | Anode sinter temp. (°C.) | Anode weight (g.) | L/C ($\mu a/\mu f$) | CV/g. ($\mu f$-V/g.) | CV/cm.$^3$ ($\mu f$-V/cm.$^3$) | Dissipation (percent) | ESR (ohms) | Pyrolysis ambient | L/C ($\mu a/\mu f$) | CV/g. ($\mu f$-V/g.) | CV/cm.$^3$ ($\mu f$-V/c.$^3$) | Dissipation (percent) | ESR (ohms) |
| 1 | 1600 | .400 | .046 | 6,780 | 60,300 | 12.4 | 4.9 | Air/water. | .190 | 5,600 | 47,040 | 9.8 | 4.7 |
| 1A | 1750 | .400 | .067 | 4,800 | 40,400 | 12.2 | 6.7 | Air/water. | .034 | 4,100 | 34,480 | 10.3 | 6.7 |
| 2 | 1600 | 1.90 | .028 | 6,820 | 51,830 | 15.0 | 1.2 | Air | .008 | 5,600 | 43,245 | 34.0 | 3.4 |
| 3 | 1600 | .410 | .020 | 5,800 | 45,880 | 4.6 | 2.0 | Air/water. | .067 | 5,795 | 45,840 | 4.1 | 1.8 |
| 3A | 1750 | .410 | .016 | 4,760 | 37,690 | 3.9 | 2.1 | Air/water. | .065 | 4,507 | 35,650 | 6.5 | 3.7 |
| 4 | 1750 | .0026 | .032 | 4,900 | 32,000 | .77 | 62.9 | Air/water. | .610 | 4,545 | 29,540 | 2.6 | 213 |
| 4A | 1750 | .0011 | .019 | 5,230 | 32,580 | .65 | 118 | Air/water. | .046 | 4,680 | 30,420 | 1.8 | 365 |
| 5 | 1600 | .310 | .03 | 8,580 | 69,240 | 9.4 | 5.2 | Air/water. | >1000 | 7,900 | 63.990 | 21.0 | 9.1 |

Table II — Notes to Table I

1. Anodization in .01% $H_3PO_4$ (90°C) to 80 Volts using 85 ma/g current density; 2 hr. hold period at 80V with current decay
2. Solids Processing
   Impregnation time (Mn $(NO_3)_2$: 3 min
   Pyrolysis Temp. and Time: 325°C, 8 min
   Pyrolysis Ambient: Air of Flowing Air/Water mixture containing .5 atm partial pressure water vapor.
   Reform Electrolyte: .01% $H_3 PO_4$ (90°C)
   Reform Rate: 2 volts/min (.5 hr, hold at maximum voltage)
   Reform Voltage: 30–45 Volts
   Impregnation-Reformation Schedule:
   three dips and pyrolysis with 12 percent manganese nitrate, reformation
   three dips and pyrolysis with 50 percent manganese nitrate, reformation.
   three dips & pyrolysis with 50 percent manganese nitrate, reformation. repetition of last two steps to build sufficient coated thickness of manganese dioxide (1/32 –1/16 inch thick)
3. Wet Test
   30 percent sulfuric acid (25°C), leakage measured at 56 volt DC bias, 3 min. reading. Capacity and dissipation measured at 120 cps, 0.5 volt AC.
4. Solids Test
   leakage measured at 20V with 1,000 ohm series resistor, 5 min, reading, capacity and dissipation measured at 120 cps, 0.5 volt AC.
5. Flat Pieces Ex. 4–.020 inch thick; Ex. 4A–.011 inch thick

TABLE III

Life Test Results of Fiber Solid Capacitors (20 volt bias at 85°C, 1000 hr.)

| Example | | I | IA | IIIA |
|---|---|---|---|---|
| No. of Units | | 7 | 5 | 4 |
| Leakage, µa/µf (Median | | | | |
| Initial | 25°C | 0.19 | 0.034 | 0.065 |
|  | 85°C | 0.64 | 0.21 | 0.36 |
| Final | 85°C | 0.90 | 0.60 | 0.46 |
|  | 25°C | 0.14 | 0.070 | 0.050 |
|  | 25°C Range | 0.03–0.23 | 0.007–0.125 | 0.013–0.076 |
| Capacitance, µf (Avg.) | | | | |
| Initial | 25°C | 28.0 | 20.5 | 23.1 |
|  | 85°C | 29.0 | 21.3 | 24.6 |
| Final 85°C | | 28.8 | 21.0 | 24.2 |
|  | 25°C | 27.8 | 20.3 | 23.0 |
| %Change | 25°C (1,000 hrs.) | −0.7 | −1.0 | −0.5 |
| TCC (25°C–85°C), % | | +3.6 | +3.9 | +6.5 |
| Dissipation Factor, % (Avg.) | | | | |
| Initial | 25°C | 9.8 | 10.3 | 6.5 |
|  | 85°C | 10.0 | 9.8 | 7.1 |
| Final | 85°C | 10.8 | 10.3 | 6.5 |
|  | 25°C | 10.3 | 11.4 | 6.0 |
| %Change | 25°C | +5.1 | +10.7 | −7.7 |

Notes:
1. Leakage measured at 20V, 1,000 ohm series resistor, 5 minute reading.
2. Capacity and Dissipation measured at 120 cps, 0.5 V. AC
3. Series resistance of biasing circuit, 2.5 ohms.

What is claimed is:

1. Process for producing a capacitor electrode or the like comprising the steps of forming contacting layers of a porous skeletal compact and a solid metal layer and co-working the composite material to fiber the porous skeletal compact portion while bonding the two layers,
said first porous layer then comprising elongated, valve metal fibers, the layer being elongated as a whole and the individual fibers thereof being also axially oriented in the direction of elongation of the layer, the fibers being interconnected by metallurgical bonds, the bonds being elongated parallel to the fiber elongation direction, with a major portion of the bond length being greater than average fiber diameter, with said second layer in reduced cross section thickness.

2. Process in accordance with claim 1 comprising, assembling powders of a valve metal around a rod of a valve metal, consolidating the powder into a coherent porous mass bonded to the core rod, impregnating the porous outer layer thus formed with a second material capable of co-working therewith, mechanically working the composite to an elongated form by the application of compressive forces to fiber the powder and reduce the rod to a central wire and then removing said infiltrant to produce pore structure in the fiber layer, and further comprising,
bonding a lead conductor to said central wire.

3. Process in accordance with claim 1 wherein powders of a valve metal are formed as a continuous layer along the face surface of a sheet of a valve metal, consolidating the powders into a coherent porous mass bonded to said valve metal, infiltrating the porous powder layer with a second material capable of co-working therewith prior to said co-working and wherein a continuous fiber layer is produced.

4. The process of claim 1 wherein the porous powder layer as a density of at least 35 percent of theoretical density and no greater than 50 percent of the theoretical density of the valve metal,
and wherein the removal of impregnant is carried out by electrochemical leaching using the product as an electrode in the electrochemical leaching process.

5. The process of claim 4 wherein the consolidation is carried out by sintering the multi-layered initial composite in a mold and subsequently further consolidating it to the required density range by a process which comprises a pressing step to form a dense outer skin on the powder layer.

6. The process of claim 3 wherein a lead wire is attached by a face-to-face weld thereof with said solid layer of the composite.

7. The process of claim 2 wherein the said lead has a narrow cross-section dimension of the same order of magnitude as a narrow cross-section dimension of the solid layer of the composite and wherein the two are butt-welded on edge.

8. The process of claim 7 wherein the weld is carried out prior to removal of said impregnant and wherein the surface of said solid layer is pre-treated to remove the said impregnant material from the vicinity of the weld site prior to conducting the weld.

9. The process of claim 1 wherein the solid layer used comprises a circular cross-section member, such as a rod or the like, and the porous compact is formed around said solid layer.

10. The process of claim 6 wherein the solid and porous layers are formed as face-to-face flat sheets.

11. The process of claim 10 wherein the sheet formed composite is cut into chips before removal of the impregnant materials.

12. The process of claim 10 wherein the sheet form composite material is cut into chips after removal of the impregnant material.

13. Process for producing a capacitor electrode or the like comprising the steps of forming contacting layers of a porous skeletal compact and a solid metal layer and co-working the composite material to fiber the porous skeletal compact portion while bonding the two layers, said first porous layer then comprising elongated, valve metal fibers, the layer being elongated as a whole and the individual fibers thereof being also axially oriented in the direction of elongation of the layer, the fibers being interconnected by metallurgical bonds, the bonds being elongated parallel to the fiber elongation direction, with a major portion of the bond length being greater than average fiber diameter, with said second layer in reduced cross section thickness, and wherein the solid layer used comprises a circular cross-section member, such as a rod or the like, and the porous compact is formed around said solid layer, infiltrating the porous layer with a metal before co-working and removing the infiltrant after co-working, the infiltrant both forming said rod and filling the pores of said porous layer and wherein the solid layer (core) and infiltrant are removed by electrochemical leaching, and lead attachment is made by implanting a valve metal lead wire in the resulting anode cavity and heat treating to bond.

* * * * *